Figure 1:
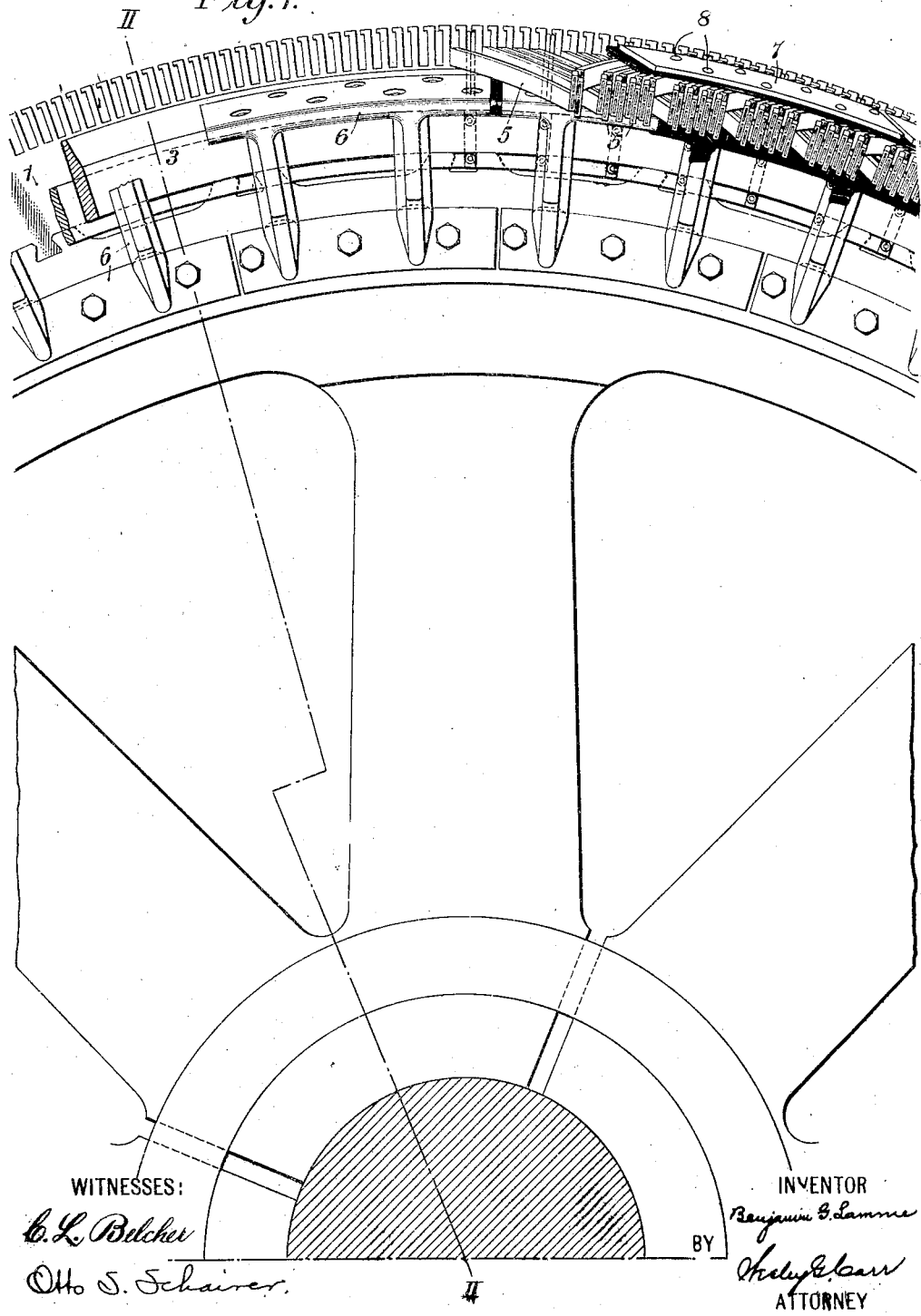

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,150,043.  Specification of Letters Patent.  Patented Aug. 17, 1915.

Application filed January 26, 1910. Serial No. 540,136.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Dynamo-Electric Machines, of which the following is a specification.

My invention relates to dynamo-electric machines, and particularly to the windings thereof and means for supporting the same.

The object of my invention is to provide a main winding for an alternating current dynamo-electric machine, the coils of which shall be so arranged and disposed as to permit of the employment of simple and effective means for supporting the end portions thereof and also of the ready employment of an auxiliary winding for equalizing the magnetic field between the relatively rotatable members.

The end portions of the rotatable members of dynamo-electric machines have heretofore been commonly secured against displacement, by means of wire bands, cylindrical shells, or end bells. However, the use of bands in large machines is objectionable, because of the necessity of removing and replacing the same in their entirety in order to repair a single injured coil, and cylindrical shells or end bells are objectionable, not only for the same reason, but because they are usually unduly expensive, and because it is very difficult to fit them closely over the end portions of the winding, which, of course, is necessary in order that they may be effective. End bells also materially interfere with the ventilation of the winding and other parts of the machine.

It has been proposed further to employ segmental clamping rings for securing the end portions of the windings to supports therefor, but such means have not been generally employed because spaces could not be provided between the coils at convenient and suitable locations for clamping bolts or devices.

According to the present invention, the coils of the main winding are disposed in groups that are spaced apart to provide openings through which extend the clamping bolts or devices for securing the end portions of the windings to supports therefor. The spacing of the coil groups also renders it expedient to employ an auxiliary winding for effecting magnetic balancing within the machine, the main portions of the said auxiliary winding occupying the spaces between the groups of coils of the main winding. In direct current machines, magnetic balancing has been usually effected without the employment of an auxiliary winding, but, in alternating current machines, it is necessary to employ an auxiliary winding if it is desired to effect this result, but the use of such windings has not been common for the reason that it has heretofore been difficult and seldom practicable to provide spaces therefor in the cores of the machines. Moreover, the air gaps in alternating current generators are usually relatively large, so that small displacement of the armature with respect to the field magnet gives but small unbalanced magnetic pull. In induction motors, however, where the air gaps are extremely small, as compared with alternating and direct current generators, a slight eccentricity or displacement of the relatively movable members with respect to each other causes a relatively large unbalanced pull, unless some means for effecting equalization thereof is employed. When the secondary windings are of the "squirrel cage" type, a certain amount of equalization is naturally obtained, this usually being sufficient in practice to accomplish the necessary or desired balancing. However, when the secondary members are adapted for use with external resistance for starting and varying the speed of the motor, little or no equalization occurs in the winding itself except, possibly, when all of the external resistance is removed from the circuit. In large machines of this character, and especially when they are adapted for operation upon low-frequency currents, the induction per pole is usually very large, while the air gap is very small, the result being that a very great unbalancing may occur, especially at slow speeds, in case there is but a very slight eccentricity or displacement between the primary and secondary members. In very large machines, therefore, the use of equalizing windings is not only highly desirable but quite necessary, and one of the objects of the present invention is to render it practicable to employ them.

Figure 2:
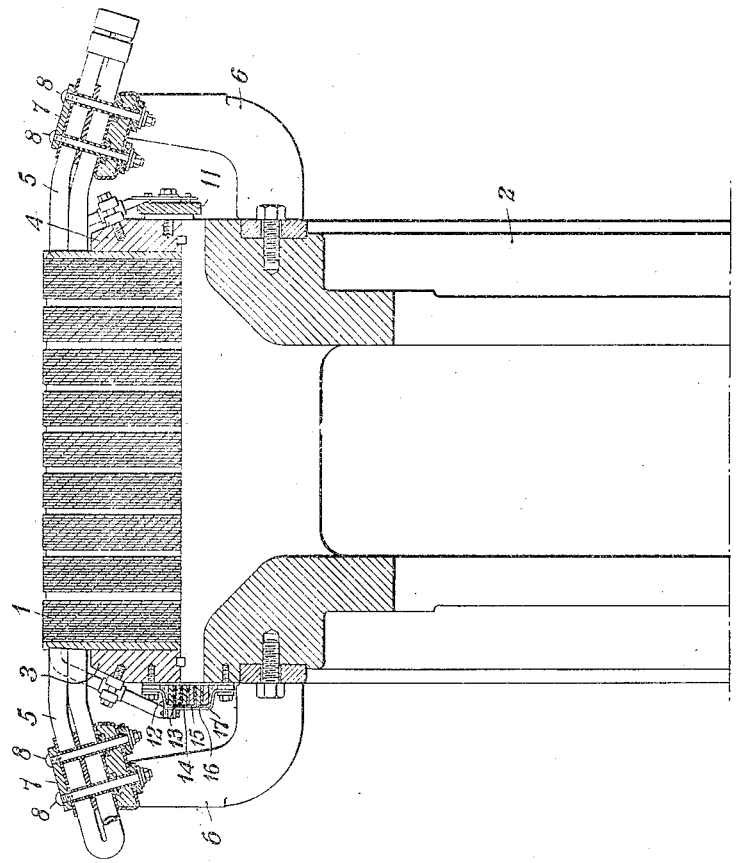
Figure 3:
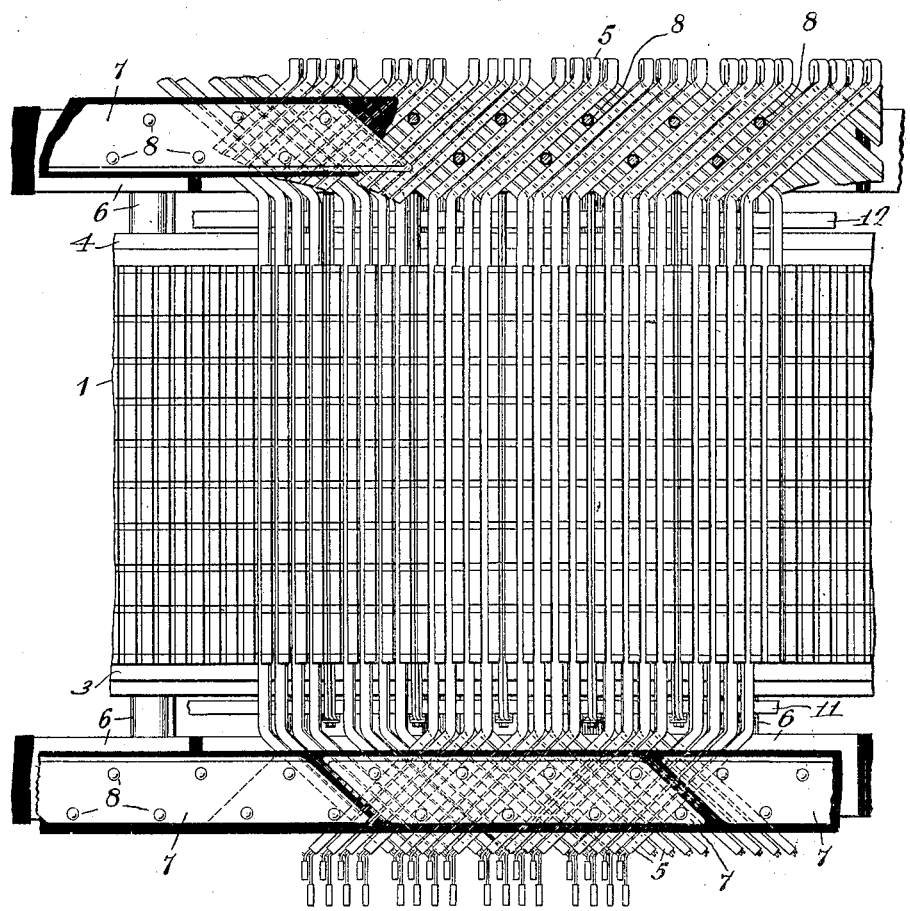
Figure 4:
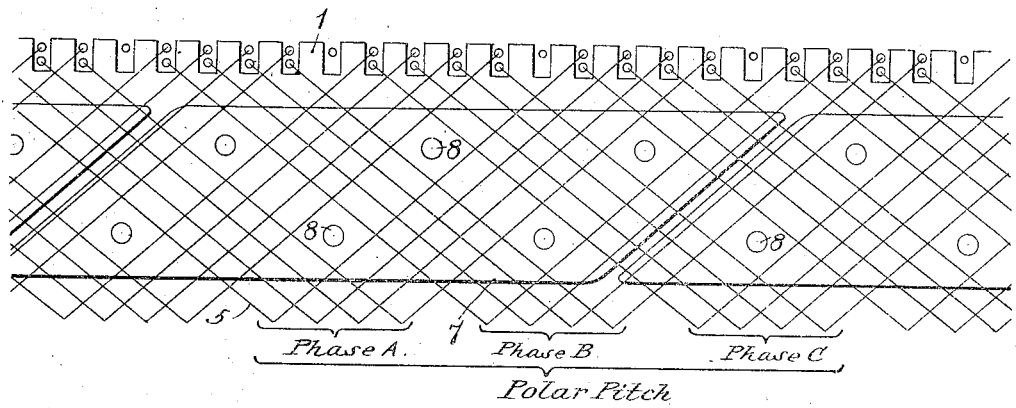
Figure 5:
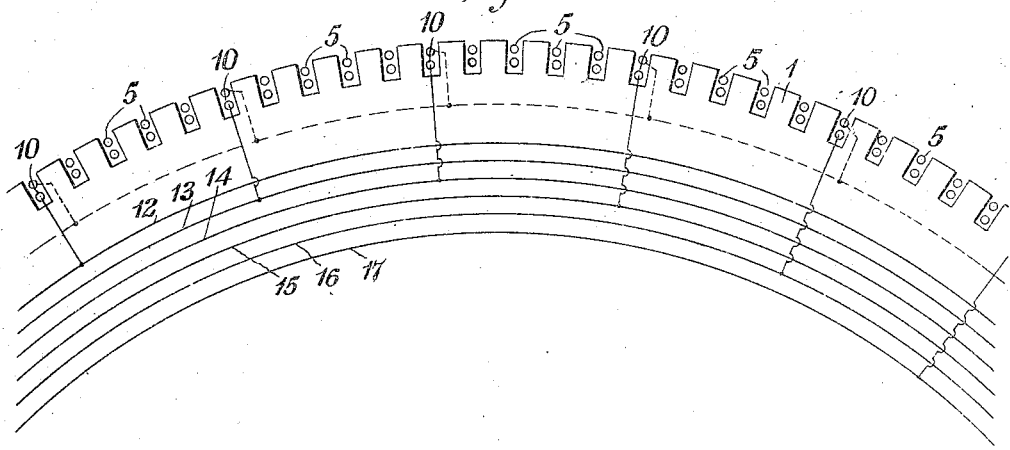

In the accompanying drawings, Figure 1 is an end view of a part of the secondary member of an induction motor that embodies my invention. Fig. 2 is a transverse sectional view of the machine on the line II—II of Fig. 1. Fig. 3 is a plan view of a part of the machine of Fig. 1, and Figs. 4 and 5 are diagrammatic views illustrating the arrangements of the main and auxiliary windings.

The invention is illustrated as applied to the secondary member of an inductor motor comprising, as usual, a laminated core 1 that is mounted upon the periphery of a spider 2 and is clamped between two end plates 3 and 4 that are keyed on, or otherwise suitably secured to, the spider. The core 1 is provided with peripheral slots that contain the windings, the main winding comprising a plurality of spaced groups of coils 5, the straight side portions of which occupy the core slots, except the slots between the coil groups. The coils 5 are arranged, as usual, in superposed layers, and the end portions thereof are of V-shape and are inclined to the straight side portions. The spaces between the groups of coils are maintained in the end portions thereof, and it will accordingly be obvious that, at the points where the spaces between the groups of coils in the upper and lower layers cross each other, there are openings extending entirely through the end portions of the winding.

The V-shaped end portions of the coils 5 are supported upon segmental brackets 6 and are clamped upon the same by segmental rings 7 and bolts 8 that extend through the openings provided in the end portions of the windings at the crossings of the spaces between the coil groups of the superposed layer of coils. The segments of the retaining rings 7 are curved plates that are arranged end to end, and the end edges of which are inclined to their side edges at substantially the same angles as the end portions of the coils are inclined to the side portions thereof. The said plates are placed upon the coils so their end edges are parallel to the portions of the coil ends that are in the inner layer, the effect of overlapping retaining means being thus obtained.

The openings through the end portions of the winding occur at such points that the retaining rings may be placed approximately midway between the core 1 and the extremities of the coils; that is, where they are most effective, and since the rings are segmental, no difficulty is experienced in securely clamping all of the coils upon the supporting brackets. The segmental retaining rings also permit of removing or repairing an injured coil with the disturbance of but a small number of other coils and without removing the said rings as a whole. The spaces between the coil groups also permit of better ventilation of the coils and core, and also effect an improvement in the insulation by providing a greater distance between the coils belonging to different phases.

The slots in the core that lie between the groups of coils of the main winding are partially occupied by cross conductors 10 of an auxiliary or equalizing winding, that comprises a single end ring 11 to which one end of all of the cross conductors are connected, and a plurality of end rings 12, 13, 14, 15, 16 and 17 to which the other ends of the cross conductors are connected, in succession. The end ring 11 is secured to the end plate 4, and the end rings 12 to 17, inclusive, are insulated from each other and secured to the end plate 3 and the spider 2. In the present instance, the main winding has three phases, and there are three groups of coils per pole, with three intervening slots in which the cross conductors 10 of the auxiliary winding are located. Only the cross conductors of normally equal potential are connected to the same rings of the sets 12 to 17, inclusive, so that no currents traverse the auxiliary winding as a result of currents in the primary winding unless there is a non-uniformity of the magnetic field in which the secondary member rotates, which non-uniformity may be caused either by eccentricity of the primary and secondary members with respect to each other, or by other irregularities. However, when currents do traverse the auxiliary winding, they serve to effect a balancing or equalizing of the magnetic field and the pull exerted thereby.

While, as shown, there are two cross-conductors and end connecting rings for each phase of the machine and there are as many groups of coils per pole of the main winding as there are phases of the machine, it is obvious that the invention is not limited to such a specific arrangement, but that any desired number of groups of coils in the main winding may be employed, as well as any desired number of cross-conductors and end connecting rings in the auxiliary winding, it only being essential for best results that only cross-conductors of the auxiliary winding having normally the same potential should be connected at both ends to the same cross-connecting rings.

I claim as my invention.

1. In a dynamo-electric machine, the combination with a winding comprising a plurality of spaced groups of coils having projecting ends also disposed in spaced groups; of an internal support for said projecting ends, external rings, and clamping bolts that project through the spaces between the coil group ends.

2. In a dynamo-electric machine, the combination with a winding comprising a plurality of spaced groups of coils having projecting ends also disposed in spaced groups, of a coil support, retaining plates, and means that project through the spaces between the coil group ends and clamp the coils between the said supports and retaining plates.

3. In a dynamo-electric machine, the combination with a winding comprising a plurality of spaced groups of coils having ends of V-shape, of a coil support, retaining plates the ends of which are substantially parallel to one side of the end portions of the coils, and means that project through the spaces between the coil group ends and clamp the coils between the said support and retaining plates.

4. In a dynamo-electric machine, the combination with a winding comprising a plurality of spaced groups of overlapping coils having projecting ends also disposed in spaced groups, of a coil support, and retaining plates intermediately disposed with reference to said projecting ends, and means that project through the spaces between the coil group ends and clamp the coils between the said support and retaining plates.

5. In a dynamo-electric machine, the combination with a slotted core, and a winding comprising a plurality of spaced groups of coils occupying the core slots except between the coil groups and having projecting ends also disposed in spaced groups, of a coil support, and means for clamping the projecting coil ends to the support, said means comprising intermediately disposed plates and bolts that project through the spaces between the coil group ends.

6. In a dynamo electric machine, the combination with a winding comprising a plurality of coils, of a segmental clamping ring for the ends of the coils, the abutting ends of the segments being inclined to the sides thereof to correspond to the inclination of certain end portions of the coils with respect to their intermediate portions.

7. In a dynamo electric machine, the combination with a winding comprising a plurality of coils having V-shaped end portions, of a segmental clamping ring for the said end portions of the coils, the abutting ends of the segments being inclined to the sides thereof and substantially parallel with certain end portions of the coils.

8. In a dynamo-electric machine, the combination with a slotted core, and a main winding comprising a plurality of spaced groups of coils occupying the core slots except between the coil groups, of internal and external coil-supporting members clamping means for said members that project through the spaces between the coil group ends, and an auxiliary winding that occupies the core slots between the coil groups.

9. In a dynamo-electric machine, the combination with a slotted core, and a main winding comprising a plurality of spaced groups of coils occupying the core slots except between the coil groups, there being as many groups of the said coils and intervening core slots per pole as there are phases of the machine, of an auxiliary closed circuit winding that occupies the core slots between the coil groups.

10. In a dynamo-electric machine, the combination with a slotted core, and a main winding comprising a plurality of spaced groups of coils occupying the slots except between the coil groups, of an auxiliary winding having cross-conductors occupying the core slots between the said coil groups, a ring at one end of the core connected to all of said cross-conductors and rings at the other end of the core respectively connected to only certain of the cross-conductors.

11. In a dynamo-electric machine, the combination with a slotted core and a main winding comprising a plurality of spaced groups of coils occupying the core slots except between the coil groups, of an auxiliary winding comprising cross conductors occupying the core slots between the said coil groups, a conductor connected to one end of all of the cross-conductors, and twice as many conductors as there are phases of the machine connected to the cross-conductors at their other ends.

12. In a dynamo-electric machine, the combination with a slotted core and a winding comprising a plurality of spaced groups of coils occupying the coil slots except between the coil groups, of an auxiliary winding comprising cross-conductors occupying the core slots between the said coil groups, a conductor connected to one end of all of the cross-conductors at their other ends.

13. In a dynamo-electric machine, the combination with a main winding comprising as many spaced groups of coils per pole of the machine as there are phases thereof, of an auxiliary closed circuit winding comprising cross-conductors occupying the spaces between the coil groups, and end connections to the cross-conductors.

14. In a dynamo-electric machine, the combination with a main winding comprising as many spaced groups of coils per pole of the machine as there are phases thereof, of an auxiliary closed circuit winding occupying the spaces between the coil groups.

15. In a dynamo-electric machine, the combination with a winding comprising a plurality of spaced groups of overlapping coils the ends of which cross each other, of an annular supporting member that engages the inner faces of intermediate portions of the coil ends, and means for clamping the coil ends to said member, said means comprising a segmental ring that engages the outer faces of said intermediate portions and bolts that project through the spaces between the coil-end groups where the said spaces cross each other.

In testimony whereof, I have hereunto subscribed my name this 19th day of Jan., 1910.

BENJ. G. LAMME.

Witnesses:
E. LIVINGSTONE,
B. B. HINES.